US012454680B2

(12) United States Patent
Kwak et al.

(10) Patent No.: US 12,454,680 B2
(45) Date of Patent: Oct. 28, 2025

(54) VERO CELL LINE THAT CAN BE SUSPENSION-CULTURED IN SERUM-FREE MEDIUM, PREPARATION METHOD THEREFOR, AND METHOD FOR PREPARING VIRUSES FOR VACCINES BY USING NOVEL CELL LINE

(71) Applicant: SK BIOSCIENCE CO., LTD., Gyeonggi-do (KR)

(72) Inventors: Jun-seok Kwak, Gyeonggi-do (KR); Eun-som Kim, Gyeonggi-do (KR); Hun Kim, Gyeonggi-do (KR); Ki-weon Seo, Gyeonggi-do (KR); Kun Se Lee, Gyeonggi-do (KR); Sujeen Lee, Gyeonggi-do (KR); Seung-hye Hong, Gyeonggi-do (KR)

(73) Assignee: SK BIOSCIENCE CO., LTD., Gyeonggi-do (KR)

( * ) Notice: Subject to any disclaimer, the term of this patent is extended or adjusted under 35 U.S.C. 154(b) by 776 days.

(21) Appl. No.: 17/780,093

(22) PCT Filed: Nov. 25, 2020

(86) PCT No.: PCT/KR2020/016866
§ 371 (c)(1),
(2) Date: May 26, 2022

(87) PCT Pub. No.: WO2021/107612
PCT Pub. Date: Jun. 3, 2021

(65) Prior Publication Data
US 2022/0411760 A1   Dec. 29, 2022

(30) Foreign Application Priority Data

Nov. 27, 2019   (KR) .................. 10-2019-0154749

(51) Int. Cl.
| | |
|---|---|
| *C12N 5/071* | (2010.01) |
| *A61K 39/00* | (2006.01) |
| *A61K 39/12* | (2006.01) |
| *C12N 7/00* | (2006.01) |

(52) U.S. Cl.
CPC ............ *C12N 5/0686* (2013.01); *A61K 39/12* (2013.01); *C12N 7/00* (2013.01); *A61K 2039/525* (2013.01); *C12N 2500/90* (2013.01); *C12N 2770/24134* (2013.01); *C12N 2770/24152* (2013.01)

(58) Field of Classification Search
CPC .... C12N 5/0686; C12N 7/00; C12N 2500/90; C12N 2770/24134; C12N 2770/24152; A61K 39/12; A61K 2039/525
See application file for complete search history.

(56) References Cited

U.S. PATENT DOCUMENTS

| | | | | |
|---|---|---|---|---|
| 7,037,707 | B2 * | 5/2006 | Webster ................. | C07H 21/04 435/235.1 |
| 9,040,296 | B2 * | 5/2015 | Mehtali .................... | C12N 7/00 435/363 |
| 9,447,383 | B2 * | 9/2016 | Park ........................ | A61P 31/12 |
| 11,883,483 | B2 * | 1/2024 | Kim ........................ | A61K 39/00 |
| 2009/0203112 | A1 | 8/2009 | Daelli et al. | |
| 2013/0183741 | A1 * | 7/2013 | Park ..................... | C12N 5/0686 435/235.1 |
| 2018/0195048 | A1 | 7/2018 | Rao | |

FOREIGN PATENT DOCUMENTS

| | | |
|---|---|---|
| CN | 1970080 A | 5/2007 |
| CN | 107267443 A | 10/2017 |
| KR | 10-2017-0116140 A | 10/2017 |
| KR | 10-1831284 B1 | 2/2018 |

OTHER PUBLICATIONS

International Search Report from corresponding PCT Application No. PCT/KR2020/016866, dated Mar. 3, 2021.
Shen, C. F., et al; "Development of suspension adapted Vero cell culture process technology for production of viral vaccines", Vaccine, Jul. 6, 2019, vol. 37, pp. 6996-7002.
Rourou Samia et al: "Adaptation of Vero cells to suspension growth for rabies virus production in different serum free media", Vaccine, Elsevier, Amsterdam, NL, vol. 37, No. 47, Jun. 11, 2019 (Jun. 11, 2019), pp. 6987-6995.
Paillet C et al: "Suspension-Vero cell cultures as a platform for viral vaccine production", Vaccine, Elsevier, Amsterdam, NL, vol. 27, No. 46, Oct. 30, 2009 (Oct. 30, 2009), pp. 6464-6467.
Randall Alfano et al: "Formulation and production of a blood-free and chemically defined virus production media for Vero cells", Biotechnology and Bioengineering, John Wiley, Hoboken, USA, vol. 117, No. 11, Aug. 1, 2020 (Aug. 1, 2020), pp. 3277-3285.

(Continued)

*Primary Examiner* — Janet L Andres
*Assistant Examiner* — Carey Alexander Stuart
(74) *Attorney, Agent, or Firm* — Harness, Dickey & Pierce, P.L.C.

(57) ABSTRACT

The present disclosure relates to sVERO 7C2, which is a Vero cell line derived from Vero cells (African Green Monkey Kidney Cell Line) distributed from the WHO and capable of suspension culture without serum components. Further, the present disclosure relates to a culture method for growing the Vero cells and a method for producing a vaccine virus using the Vero cells.

9 Claims, 6 Drawing Sheets

(56) References Cited

OTHER PUBLICATIONS

Kolell K et al: "Virus production in Vero cells using a serum-free medium", Cell Technology for Cell Products: Proceedings of the 19th Esact Meeting, Harrogate, UK, Jun. 5-8, 2005, Springer, NL, Jan. 24, 24 2007 (Jan. 24, 2007), pp. 583-585.
Nikolay Alexander et al: "Propagation of Brazilian Zika virus strains in static and suspension cultures using Vero and BHK cells", Vaccine, Elsevier, Amsterdam, NL, vol. 36, No. 22, Mar. 23, 2017 (Mar. 23, 2017), pp. 3140-3145.
Barrett P. Noel et al: "Vero cell technology for rapid development of inactivated whole virus vaccines for emerging viral diseases", Expert Review of Vaccines, vol. 16, No. 9, Sep. 2, 2017 (Sep. 2, 2017), pp. 883-894.
Extended European Search Report from corresponding European Patent Application No. 20893843.1, dated Dec. 6, 2023.
First Examination Report from corresponding CN Application No. 202080082143.5, dated Jul. 23, 2025.

* cited by examiner

Vero sky 7458          sVERO 7C2

VERO CELL LINE THAT CAN BE SUSPENSION-CULTURED IN SERUM-FREE MEDIUM, PREPARATION METHOD THEREFOR, AND METHOD FOR PREPARING VIRUSES FOR VACCINES BY USING NOVEL CELL LINE

CROSS-REFERENCE TO RELATED APPLICATIONS

This application is a national phase application of PCT Application No. PCT/KR2020/016866, filed on Nov. 25, 2020, which claims the benefit and priority to Korean Patent Application No. 10-2019-0154749, filed on Nov. 27, 2019. The entire disclosures of the applications identified in this paragraph are incorporated herein by references.

TECHNICAL FIELD

The present application claims the priority based on Korean Patent Application No. 10-2019-0154749 filed on Nov. 27, 2019, and all the contents disclosed in the description and drawings of the corresponding application are incorporated in the present application.

The present disclosure relates to a novel cell line derived from Vero capable of suspension culture in a serum-free medium, a method for preparing the same, and a method for preparing a virus using the suspension cultured cells.

BACKGROUND ART

With the commercialization of various types of vaccines, methods for manufacturing vaccines have also been developed in various ways. As a traditional method of vaccine production, a representative example is production of a flu vaccine using fertilized eggs. In the case of producing a vaccine using fertilized eggs, it is difficult to provide a stable supply of fertilized eggs, and accordingly, there is a limitation in that the vaccine production must be adjusted. In addition, chickens suitable for product production must be raised in aseptic facilities, and there is a problem of increased cost, and a disadvantage that people with egg protein allergy cannot get vaccinated due to the difficulty in purifying egg protein-derived ingredients.

As a method for overcoming the problem of vaccine production using fertilized eggs, there is a method of manufacturing a vaccine using cell culture. Since the vaccine is produced by inoculating virus after mass culturing of animal cells capable of immortal growth, it can be supplied through mass production in a short period of time, and has the advantage that people with egg protein allergy can be inoculated.

These animal cells are generally adherent cells and fetal bovine serum (FBS) is used for culture, but in this case, there is a possibility that unknown animal-derived factors may be included in the product, and there may be differences in quality between the products. In addition, fetal bovine serum is expensive and there is a risk of infection by infectious proteins such as prion, virus, and *mycoplasma*, so it has disadvantages that safety is not guaranteed with the increase of cost for manufacturing the products. Therefore, it is preferable not to use animal-derived additives as well as animal-derived serum in the production of vaccines.

On the other hand, as another method of cell culture, the method of culturing cells in a suspended state has several advantages, such as ease of mass culture, simplification of the passage process, reduction of manpower, and space utilization compared to the adherent cell culture method. For this reason, a lot of research is being done on the development of serum-free floating cells and virus propagation using them.

The Vero cell line is an established cell line capable of propagating various viruses due to its high sensitivity to various viruses such as rota, polio, influenza, Japanese encephalitis, and dengue virus. However, since the Vero cell line has very strong adhesion to the surface, a culture vessel of a very large area or micro-carriers are required for mass culture, which incurs a lot of cost in the vaccine manufacturing process. In addition, a step of removing the cells attached to the carriers is required. In this case, animal-derived trypsin is used, and there is a possibility of cell loss and damage along with the use of animal-derived components.

Therefore, in order to produce a vaccine through safe and efficient animal cell culture, a Vero cell line capable of suspension culture in a serum-free medium was needed, and the present inventors had previously studied Vero cell lines capable of serum-free suspension culture and obtained a patent (Korean Patent No. 10-1831284).

However, Vero sky 7458, a floating Vero cell line of the previously registered patent (Korean Patent No. 10-1831284), showed some limited effects in cell proliferation and virus infectivity.

SUMMARY

Technical Problem

In this study, in the process of developing new cells, the present inventors have tried to establish a new floating Vero cell line with superior cell proliferation, cell morphology and virus proliferation compared to the previously registered patent cell line (Vero sky 7458) through the process of selecting cells with excellent functions.

Accordingly, it is an object of the present disclosure to provide a Vero cell line that can be used for virus propagation for vaccines and capable of serum-free culture and suspension culture in order to solve the problem of contamination or culturing inefficiency caused by the use of serum and adherent culture.

Another object of the present disclosure is to provide a more efficient method for virus propagation and vaccine production by providing a cell line having an excellent effect in cell proliferation or virus propagation ability compared to the previously registered patent cell line (Vero sky 7458).

More particularly, it is an object of the present disclosure to provide the following embodiments.

Embodiment 1. A Vero cell line sVERO 7C2 deposited under accession number KCLRF-BP-00470.

Embodiment 2. The Vero cell line according to Embodiment 1, wherein the Vero cell line is derived from Vero cells distributed by the World Health Organization (WHO), does not require serum for cell growth, and can be cultured in suspension without the need for a carrier for adhesion.

Embodiment 3. The Vero cell line according to any of the preceding embodiments, characterized in that the cell line propagates a virus.

Embodiment 4. A method for preparing a virus for a vaccine using the cell line according to any of the preceding embodiments; or a use of the cell line according to any of the preceding embodiments for the production of a virus for a vaccine.

Embodiment 5. The method or use according to any of the preceding embodiments, wherein the virus is selected from the group consisting of yellow fever virus, Zika virus, rotavirus, dengue virus, influenza virus, measles virus, Japanese encephalitis virus, mumps virus, rubella virus, poliovirus, Herpes simplex virus 1 (HSV-1), Herpes simplex virus 1 (HSV-2), rabies virus, Respiratory Syncytial Virus, reovirus type 3, parvovirus, coxsackie virus, adenovirus types 1 to 47, Lassa virus, bullous stomatitis virus and vaccinia virus.

Embodiment 6. The method or use according to any of the preceding embodiments, wherein the virus is yellow fever or Zika virus.

Embodiment 7. A method for producing the cell line according to any of the preceding embodiments, which does not require serum for cell growth, and can be cultured in suspension without the need for a carrier for adhesion, comprising:
(a) preparing the Vero cells obtained from the World Health Organization (WHO);
(b) adapting the Vero cells to grow in a serum-free medium; and
(c) adapting the adherent Vero cells selected in step (b) to grow in a suspended state without a carrier for attachment.

Embodiment 8. A method for producing a virus for a vaccine comprising:
(a) inoculating the Vero cells according to any of the preceding embodiments into a serum-free cell culture medium at a concentration of $1\times10^5$ to $9\times10^5$ cells/mL;
(b) culturing the Vero cells in a spinner flask to proliferate to a cell density of $5.0\times10^5$ to $4.7\times10^6$ cells/mL, comprising a step of culturing the cells maintaining a culture condition of a stirring speed 40 to 90 revolutions per minute (rpm) and a pH 6.5 to 7.5;
(c) infecting the proliferated Vero cells with yellow fever virus or Zika virus;
(d) culturing the infected proliferated Vero cells; and
(e) isolating yellow fever virus or Zika virus from the cell culture composition.

Embodiment 9. The method according to any of the preceding embodiments, wherein a fresh medium is added to the cell culture or a part of the medium is removed and replaced with a fresh medium during step (b).

Further objects and advantages of the present disclosure will become more apparent from the following detailed description of the invention, claims and drawings.

Technical Solution

In order to achieve the above objects, the present disclosure provides a novel floating Vero cell line (Korea Cell Line Research Foundation Accession No.: KCLRF-BP-00470) having excellent virus infectivity and a growth rate which is further improved by 70-100% compared to the previously registered patent cell line Vero sky 7458, as a novel cell line that can be suspended in a serum-free medium, and is derived from Vero cells (African Green Monkey Kidney Cell Line) distributed by the World Health Organization (WHO).

In addition, in order to achieve the above objects, the present disclosure provides a method for producing the novel floating Vero cell line, comprising:
1) adapting adherent Vero cell line to a serum-free medium;
2) selecting cells showing excellent growth;
3) suspending the selected cells in a serum-free medium; and
4) selecting cells having low cell aggregation and excellent proliferative ability among the floating cells and continuously subculturing them.

In addition, another aspect of the present disclosure to achieve the above objects provides a method for preparing a vaccine comprising:
1) infecting the novel floating Vero cell line of the present disclosure with a virus;
2) culturing the virus-infected cells in a suspended state; and
3) isolating the virus from the cell culture.

In addition, in order to achieve the above objects, the present disclosure provides results for the characteristics of the novel cell line of the present disclosure, comprising:
1) evaluating tumorigenicity of the novel floating Vero cell line;
2) determining the origin of the novel floating Vero cell line; and
3) evaluating the long-term stability of the novel floating Vero cell line.

Effects

The present disclosure provides a novel sVERO 7C2 cell line that can be cultured without serum and suspended in culture, has a faster growth rate compared to Vero sky 7458 cell line, and can be efficiently used for virus propagation. The present disclosure can also be useful to produce viruses or vaccines using these cell lines.

BRIEF DESCRIPTION OF THE DRAWINGS

The following drawings attached to this specification illustrate preferred embodiments of the present disclosure, and serve to further understand the technical spirit of the present disclosure together with the above-described content of the invention, so the present disclosure should not be construed as being limited to the matters described in those drawings.

DETAILED DESCRIPTION

Figure 1:
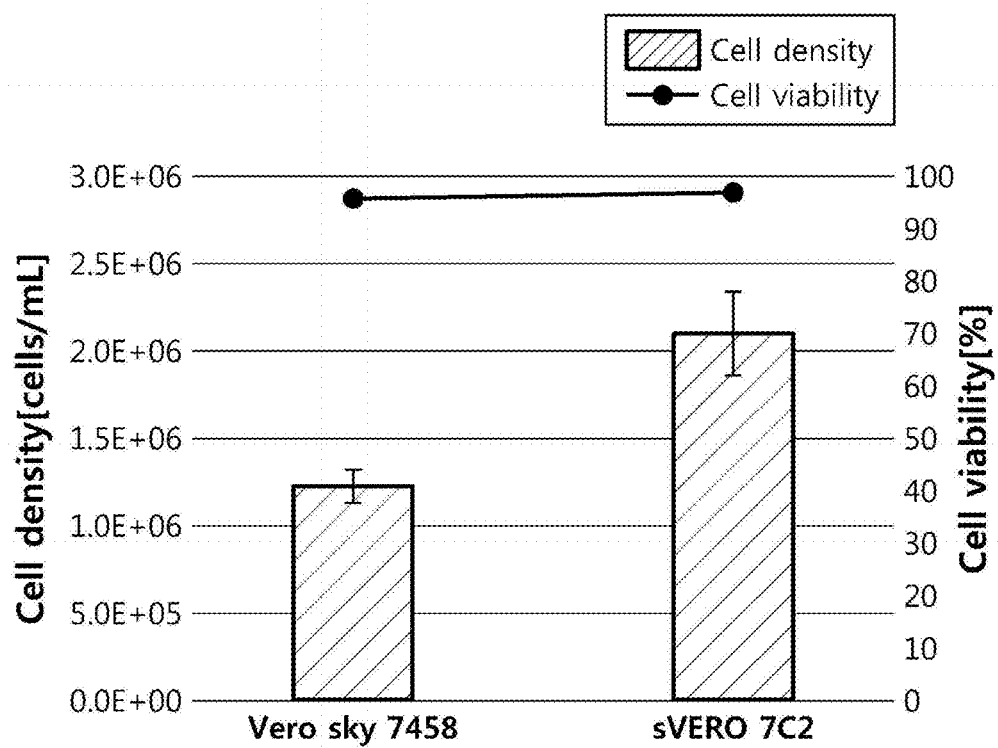
FIG. 1 is a graph showing the cell proliferation of Vero sky 7458 and the novel sVERO 7C2 cell line of the present disclosure in a 125 mL spinner flask.
Figure 2:
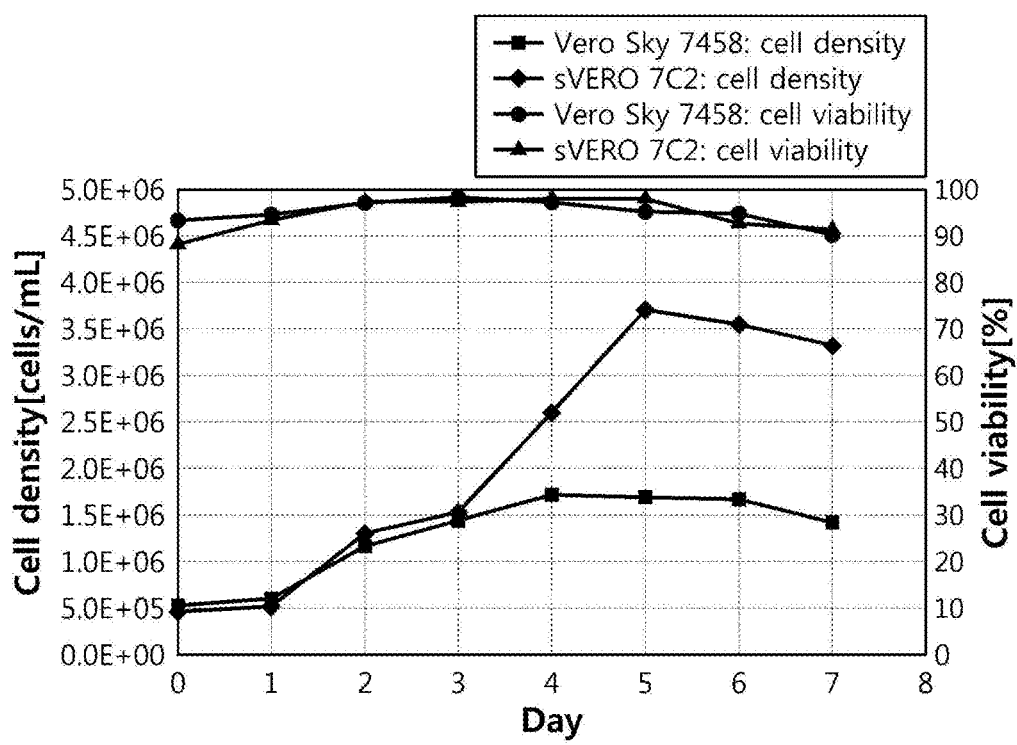
FIG. 2 is a graph showing the cell proliferation of Vero sky 7458 and the novel SVERO 7C2 cell line of the present disclosure in a 5 L bioreactor.
Figure 3:
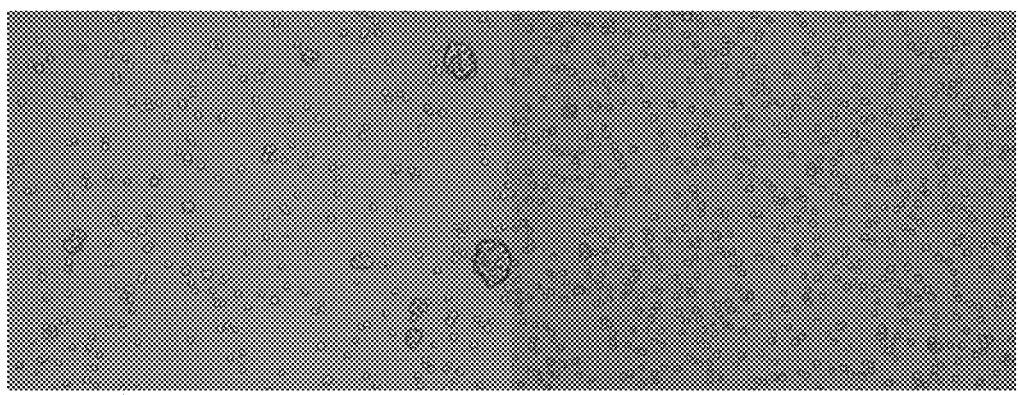
FIG. 3 is an image of the cell shape of each of Vero sky 7458 and the novel sVERO 7C2 cell line of the present disclosure.
Figure 4:
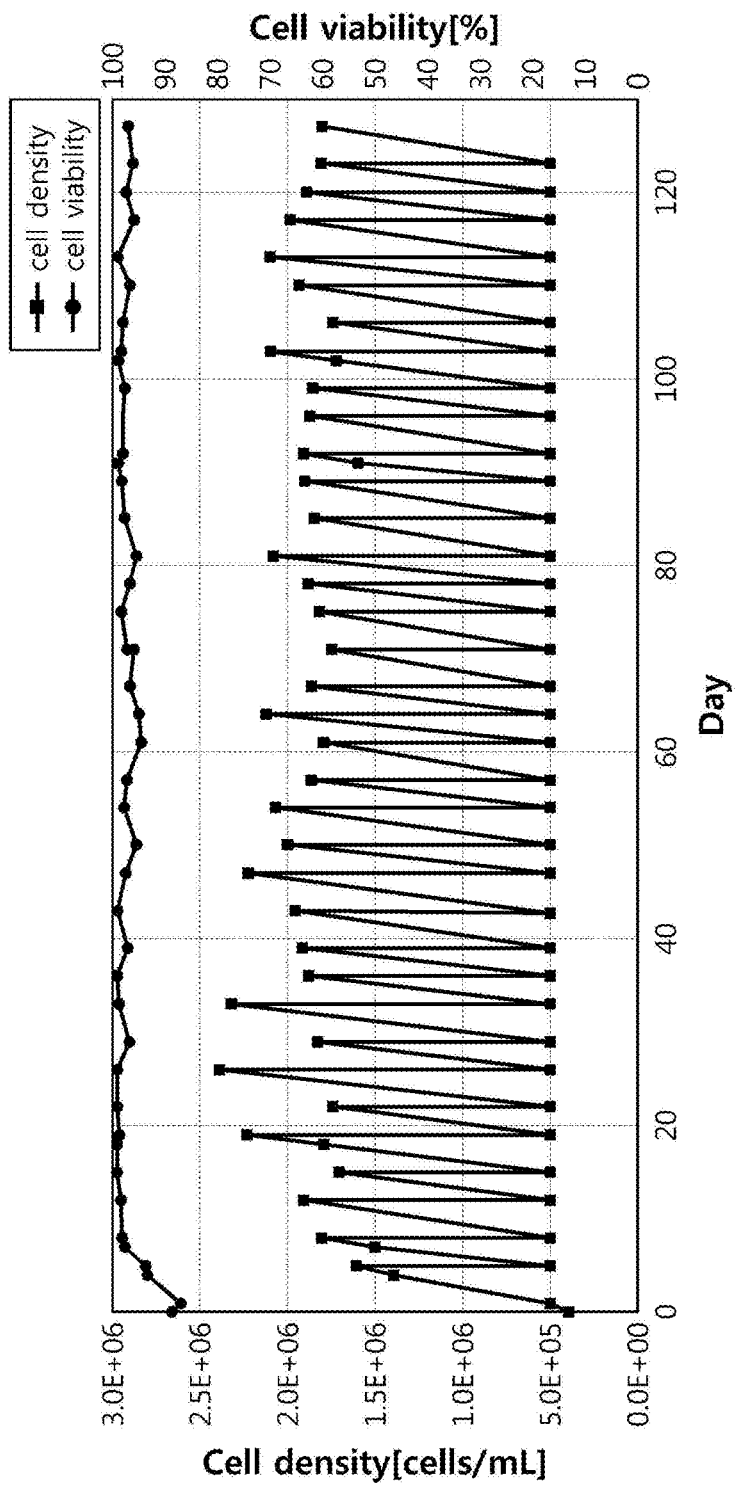
FIGS. 4 and 5 are graphs showing the cell proliferation pattern and the concentration of cell metabolites for evaluating the long-term stability of the novel sVERO 7C2 cell line of the present disclosure.
Figure 5:
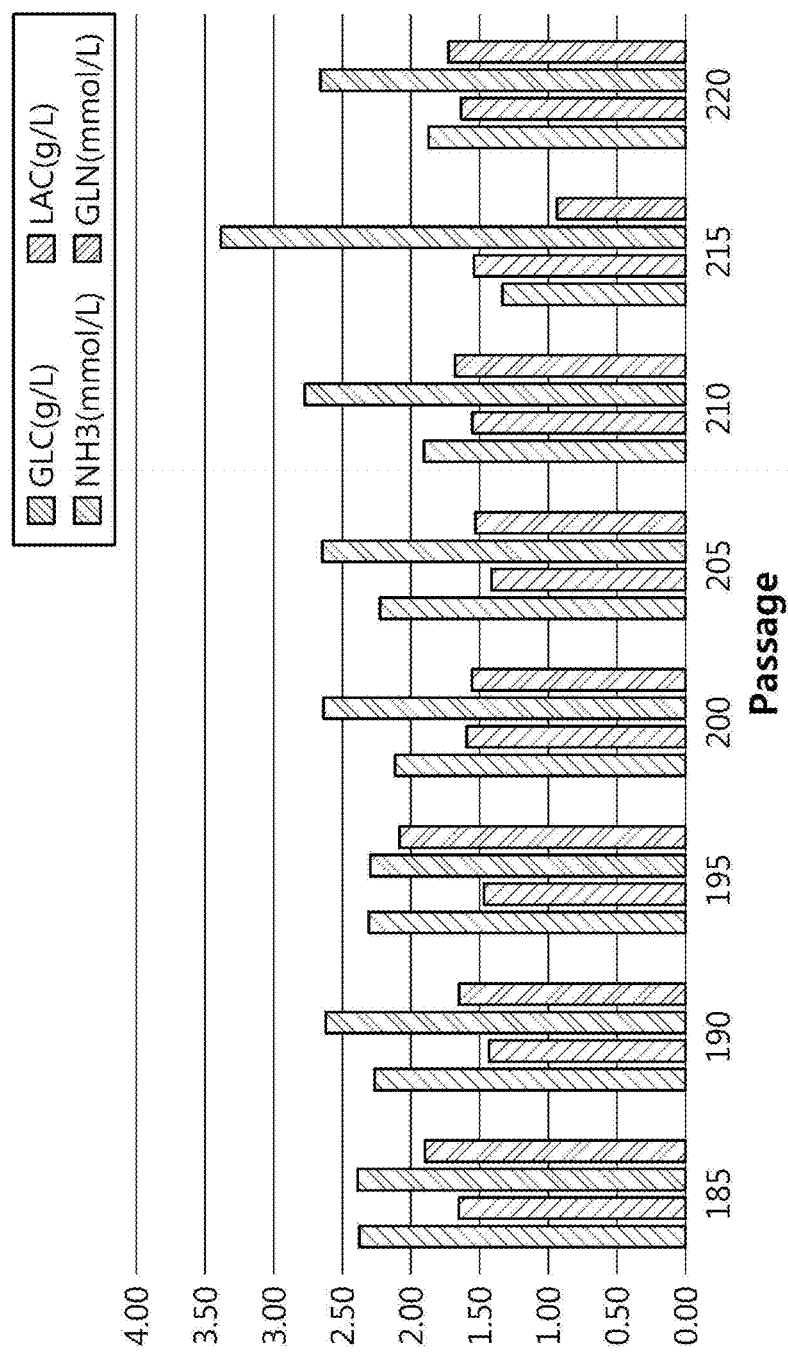
Figure 6:
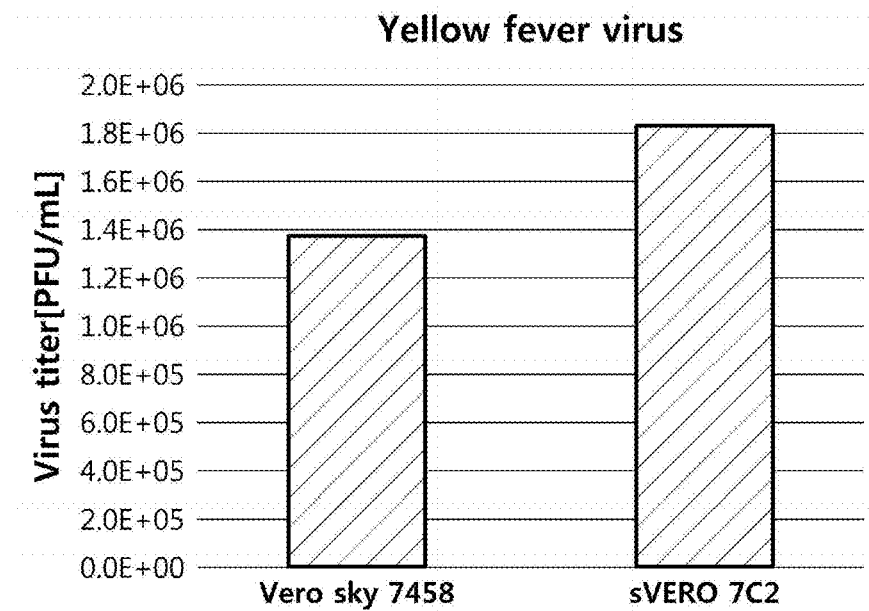
FIGS. 6 and 7 are graphs showing the results of virus titer according to virus inoculation in Vero sky 7458 and the novel sVERO 7C2 cell line of the present disclosure.
Figure 7:
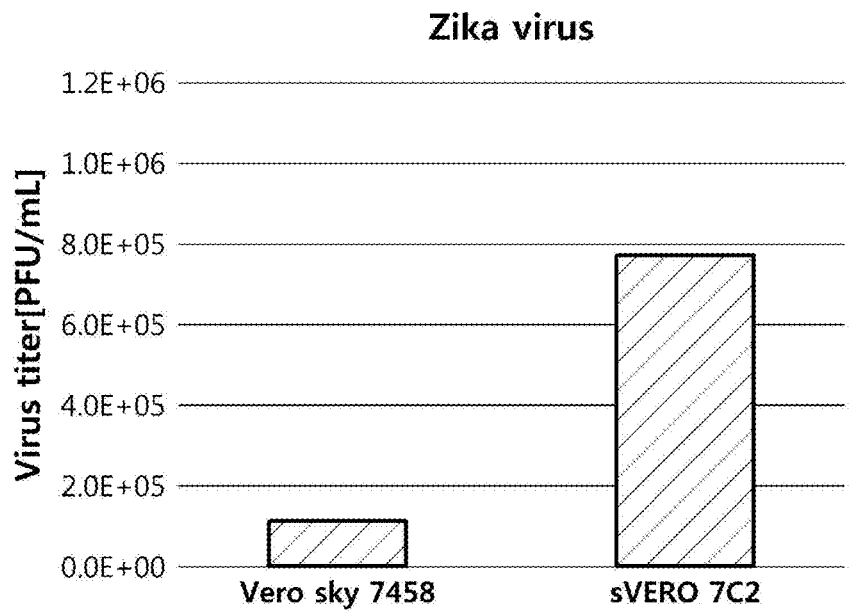

The novel sVERO 7C2 cell line of the present disclosure is derived from Vero cells (African Green Monkey Kidney Cell Line) distributed by the WHO, does not require serum for cell growth, and can be suspended in culture without the need for a carrier for adhesion.

In the present disclosure, the term "serum-free medium" refers to a medium in which the established cell line according to the present disclosure can be cultured in which serum is not substantially added, and the term "substantially not added" refers to comprising 0.5 (v/v) % or less of serum, preferably 0.1 (v/v) % or less, more preferably 0.01 (v/v) % or less, and the most preferably none at all.

The serum-free medium may be at least one selected from the group consisting of Sky FM03 (Lonza), SFM4CHO (Hyclone), ProVero1 (Lonza), EX-CELL VERO (Sigma) and VP-SFM (Gibco), but is not limited thereto, and any serum-free medium that can be used for culturing animal cells can be applied to the present disclosure without limitation.

The novel sVERO 7C2 cell line of the present disclosure preferably exhibits additionally improved cell growth by 70% or 100% or more, compared to Vero sky 7458 cell line. It can be prepared according to a method comprising a series of steps for selectively selecting cells having a relatively fast cell proliferation and low cell aggregation. As the cell growth is improved, the number of virus-infected cells increases, which is beneficial for mass production of viruses or vaccines.

In addition, sVERO 7C2 cell line of the present disclosure, which can be suspended in a serum-free medium, exhibits a higher virus titer compared to Vero sky 7458, and thus has more excellent virus production ability. In addition, the results of the species verification test using the test for tumorigenicity, karyotype analysis, and PCR showed that the novel cell line of the present disclosure had no tumorigenicity even at a high passage number (Passage No. 220), and showed that it is derived from monkey cells and thus can be valuably used for the production of viruses for vaccines.

In addition, the present inventors have named the cell line capable of serum-free and suspension culture newly established from the Vero cells as "sVERO 7C2" and deposited with the Korea Cell Line Research Foundation (KCLRF) on Sep. 9, 2019, with accession number KCLRF-BP-00470.

One aspect of the present disclosure provides a novel sVERO 7C2 cell line capable of serum-free suspension culture. For example, it can be prepared according to a method comprising: (a) thawing the adherent Vero cells (WHO) and then culturing in serum containing medium; (b) culturing the cells obtained in the step a) while lowering the serum content and finally culturing in a serum-free medium; (c) selecting individuals with rapid cell proliferation among the cells obtained in the step b); (d) adapting the cells obtained in the step c) to suspension culture in a manner of stirring at 40 to 90 rpm; (e) selecting individuals having low cell cohesion and excellent proliferative ability among the cells adapted to the suspension culture obtained in the step d).

The production method of sVERO 7C2 cell line of the present disclosure will be described in detail.

Step (a)

In step (a), Vero cells (WHO) are thawed and then cultured in the candidate medium group containing 10% fetal bovine serum (FBS) under 37° C. and 5% $CO_2$ environment.

Step (b)

In step (b), the cells cultured in the step (a) are obtained by suspending the cells at the bottom of the flask using 0.25% trypsin EDTA after 3-4 days, and then subcultured in an adherent state while lowering the serum content. When the cell doubling time is less than 48 hours, the serum ratio is lowered and finally replaced with a serum-free medium.

Step (c)

In step (c), cells are selected by performing single cell cloning on the cells obtained in the step (b). Inoculate cells at a concentration of 1 cell/well in a 96-well plate and observe the cell proliferation pattern. Specifically, this is to secure a homogeneous cell line derived from a single cell by selecting one cell with excellent proliferative ability among cells that can be cultured and adapted to a serum-free medium, thereby securing consistent cell proliferative capacity or virus infectivity in the future. In the present disclosure, the single cell cloning is performed in the serum-free adaptation step (c) and the suspension culture adaptation step (e) of Vero cells (WHO), respectively, and homogeneity of newly developed cells can be secured through a total of 2 rounds of cell selection process. This is different from the previous studies of Vero cells that can be suspended in culture.

For example, it is not easy to inoculate a single cell in a 96-well plate and culture them. Even if a single cell attaches to the culture vessel, it takes a long period of 4 weeks or more for the cell to proliferate, or the cell may not grow easily and become deteriorated. Therefore, in order to overcome this, a medium suitable for performing single cell cloning is prepared using the suspension culture medium, and thereby a single cell is cultured. Through this process, a single individual with relatively fast cell proliferation is selected.

Step (d)

In step (d), the cells obtained in the step (c) are adapted to suspension culture in a manner of stirring at 40 to 90 rpm in a spinner flask. Specifically, the cells of step (c) are inoculated into the serum-free suspension culture medium at an inoculation concentration of $1.0 \times 10^5$ to $9.0 \times 10^5$ cells/mL, preferably $5.0 \times 10^5$ cells/mL. While maintaining culture conditions of 40 to 90 rpm, preferably 60 rpm of agitation speed, and about 6.5 to 7.5 pH, the cells are subcultured at 3-4 day intervals to adapt to suspension culture.

Step (e)

In step (e), the cells obtained in the step (d) are subjected to single cell cloning as in the step (c) to select individuals with low cell cohesion and excellent proliferative capacity. At this time, the culture vessel induces the cells to proliferate in a suspended state using an ultra-low attachment 96-well plate rather than a general adherent culture vessel. Through the process of selecting single cells twice, a floating Vero cell line that shows superior performance compared to the floating Vero of the prior literature can be established, and this is named "sVERO 7C2". In addition, sVERO 7C2 is continuously subcultured in a spinner flask to check the long-term stability and cell proliferation pattern of the cell line, and perform characterization such as a tumorigenicity test.

Another aspect of the present disclosure provides a method for propagating a vaccine virus using sVERO 7C2 cell line according to the present disclosure.

Viruses that can be propagated using sVERO 7C2 cell line according to the present disclosure include, for example, yellow fever virus, Zika virus, rotavirus, dengue virus, influenza virus, measles virus, Japanese encephalitis virus, mumps virus, rubella virus, polio viruses, Herpes simplex virus 1 (HSV-1), Herpes simplex virus 2 (HSV-2), rabies virus, Respiratory Syncytial Virus, reovirus type 3, parvovirus, coxsackie virus, adenovirus types 1 to 47, Lassa virus, bullous stomatitis virus and vaccinia virus, etc. The cell line according to the present disclosure is more suitable for the production of yellow fever virus and Zika virus among these viruses.

Hereinafter, the present disclosure will be described in more detail by way of examples. However, the following examples are only for illustrating the present disclosure, and the scope of the present disclosure is not limited by the examples. The embodiments of the present disclosure are provided to more completely explain the present disclosure to those of ordinary skill in the art.

<Example 1> Preparation of Serum-Free Suspension Cultured Vero Cell Line 1.1 Thaw Adherent Vero Cells Cryopreserved adherent Vero cells (WHO) were thawed and cultured in EMEM medium containing 10% serum in a T-75 flask under 37° C., 5% $CO_2$ conditions.

1.2 Selection of Serum-Free Adaptive Cell Lines

The cells obtained in 1.1 were subcultured at intervals of 3 to 4 days. The number of cells was checked every time passaging was performed, and if the cell doubling time was 48 hours or less, the serum ratio in the medium was reduced and cultured. The serum ratio in the medium was lowered to 10%, 5%, 2%, and 1%, and subculture was repeated until finally serum-free culture was possible. Single cell cloning was performed on the serum-free adaptive cells in a 96-well plate. The medium was exchanged once a week, cultured for about 3 to 4 weeks, and a group with relatively rapid cell proliferation was selected through microscopic observation. The cell group with rapid cell proliferation was expanded and cultured in T-flasks.

1.3 Selection of Suspension Culture-Adapted Cell Lines

The cells obtained in 1.2 were sufficiently expanded and transferred to a spinner flask to perform suspension culture. The agitation speed was 60 rpm, and the cells were cultured at a temperature of 37° C. and 5% $CO_2$ condition. When the pH of the culture medium became lowered or the cells grew above a certain level, the medium was exchanged or subcultured. After 2 months of acclimatization to floating culture, the cell concentration reached a level of about $1.5 \times 10^6$ cells/mL. It was confirmed that the cell viability was more than 90%. Single cell cloning was performed in an ultra-low attachment 96-well plate to secure single cells with a fast cell proliferation rate and low cell cohesion among the suspension culture-adapted cells. After culturing for about 3 to 4 weeks, the group with relatively rapid cell proliferation was selected through microscopic observation. The cells were expanded with an ultra-low attachment T-flask to select one group with the fastest proliferation rate, and this group was named "sVERO 7C2".

<Example 2> Proliferative Capacity and Characterization of Cell Lines 2.1 Evaluation of Proliferative Capacity of the Novel Cell Line sVERO 7C2 cell line was suspension cultured in a spinner flask or a 5 L bioreactor to evaluate its proliferative capacity. Vero sky 7458 cell line was used as a control.

For the suspension culture, the starting cell concentration was $5.0 \times 10^5$ cells/mL, and in the case of a spinner flask, the cells were recovered after 3 to 4 days, centrifuged at 1200 rpm for 5 minutes, and subcultured at $5.0 \times 10^5$ cells/mL.

sVERO 7C2 cell line prepared in the present disclosure showed a cell proliferation rate of about 1.7 times in a spinner flask and about 2 times in a bioreactor compared to Vero sky 7458 cell line.

2.2 Long-Term Passage Stability of the Novel Cell Line sVERO 7C2 cell line was subcultured in a spinner flask for 4 months, and stability for long-term passage was evaluated by analyzing cell proliferation, cell viability, and cell metabolites. The cell line of the present disclosure showed the same level of cell proliferation during the culture period of 4 months, and it was possible to confirm the cell viability of 90% or more. In addition, the concentration of cellular metabolites in a similar pattern could be confirmed.

2.3 Characterization of the Novel Cell Line

A tumorigenicity test was performed on the novel sVERO 7C2 cell line of the present disclosure. Based on the guidelines for the evaluation of tumorigenicity of the European Pharmacopoeia, the test was conducted at Cubest Bio, a non-clinical evaluation center, and as a result of clinical pathology, it was found that the cell line of the present disclosure had no tumorigenicity even at a high passage number (Passage No. 220).

In addition, it was confirmed that the cell line of the present disclosure is a monkey-derived cell by performing karyotype analysis and species discrimination test (PCR).

Furthermore, it was confirmed that it was not contaminated with bacteria by performing sterility and *mycoplasma* negative tests.

<Example 3> Comparison of Virus Proliferation Ability

Viruses were propagated in suspension culture conditions using the novel sVERO 7C2 cell line of the present disclosure. As a control, Vero sky 7458 was used to compare virus proliferation. Viruses used in this experiment were yellow fever virus and Zika virus, and the culture conditions were as follows.

Cell Concentration: $5.0 \times 10^5$ cells/mL
Culture scale: 125 mL spinner flask
Stirring speed: 60 rpm
Incubation conditions: 37° C., 5% $CO_2$, wet
Incubation period: 4 days (yellow fever virus), 6 days (Zika virus)
Virus infectivity test was performed at the same starting cell concentration and virus inoculation concentration to compare the virus proliferation ability between the two cell lines. After inoculation, the virus was cultured while checking the cytopathic effect (CPE) and cell viability. Yellow fever virus was cultured for 4 days and Zika virus was cultured for 6 days, and the culture supernatant was recovered and virus titer was measured. The titer of the two viruses was measured by performing a plaque assay. As a result, it was shown that the virus titer propagated in the novel cell line of the present disclosure was superior to that of Vero sky 7458 used as a control. Moreover, it was found that sVERO 7C2 has a higher cell proliferative ability than Vero sky 7458, and thus the number of cells to be infected during virus infection is large, so that it is possible to produce a large-capacity virus more efficiently.

DEPOSIT ACCESSION NUMBER

Name of depositary: Korea Cell Line Research Foundation (KCLRF)
Accession number: KCLRF-BP-00470
Deposit date: Sep. 9, 2019

What is claimed is:

1. A Vero cell line sVERO 7C2 deposited under accession number KCLRF-BP-00470.

2. The Vero cell line according to claim 1, wherein the cell line is derived from Vero cells distributed by the World Health Organization (WHO), and wherein the cell line does not require serum for cell growth and can be cultured in suspension without the need for a carrier for adhesion.

3. The Vero cell line according to claim 1, wherein the cell line propagates a virus.

4. A method for preparing a virus for a vaccine using the cell line according to claim 1.

5. The method according to claim 4, wherein the virus is selected from the group consisting of yellow fever virus, Zika virus, rotavirus, dengue virus, influenza virus, measles virus, Japanese encephalitis virus, mumps virus, rubella virus, poliovirus, Herpes simplex virus 1 (HSV-1), Herpes simplex virus 2 (HSV-2), rabies virus, Respiratory Syncytial virus, reovirus type 3, parvovirus, coxsackie virus, adenovirus types 1 to 47, Lassa virus, vesicular stomatitis virus and vaccinia virus.

6. The method according to claim 4, wherein the virus is yellow fever virus or Zika virus.

7. A method for producing the cell line according to claim 1, which does not require serum for cell growth, and can be cultured in suspension without the need for a carrier for adhesion, comprising:
    (a) preparing Vero cells received from the World Health Organization (WHO);
    (b) adapting the Vero cells to grow in a serum-free medium; and
    (c) adapting the adherent Vero cells selected in step (b) to grow in a suspended state without a carrier for attachment.

8. A method for producing a virus for a vaccine comprising:
    (a) inoculating the Vero cells according to claim 1 into a serum-free cell culture medium at a concentration of $1\times10^5$ to $9\times10^5$ cells/mL;
    (b) proliferating the Vero cells in a spinner flask to a cell density of $5.0\times10^5$ to $4.7\times10^6$ cells/mL comprising culturing the cells while maintaining a culture condition of a stirring speed of 40 to 90 revolutions per minute (rpm) and a pH of 6.5 to 7.5;
    (c) infecting the proliferated Vero cells with yellow fever virus or Zika virus;
    (d) culturing the infected proliferated Vero cells; and
    (e) isolating the yellow fever virus or Zika virus from the cell culture composition.

9. The method according to claim 7, wherein fresh medium is added to the cell culture or the medium is partially removed and replaced with fresh medium during step (b).

* * * * *